US012508213B2

(12) United States Patent
Heilmann et al.

(10) Patent No.: US 12,508,213 B2
(45) Date of Patent: Dec. 30, 2025

(54) AQUEOUS OXIDIZING COMPOSITION COMPRISING AMINO ACIDS

(71) Applicant: Kao Corporation, Tokyo (JP)

(72) Inventors: Jens Heilmann, Darmstadt (DE); Peter Bauer, Darmstadt (DE)

(73) Assignee: Kao Corporation, Tokyo (JP)

( * ) Notice: Subject to any disclaimer, the term of this patent is extended or adjusted under 35 U.S.C. 154(b) by 796 days.

(21) Appl. No.: 17/773,497

(22) PCT Filed: Oct. 30, 2020

(86) PCT No.: PCT/EP2020/080538
§ 371 (c)(1),
(2) Date: Apr. 29, 2022

(87) PCT Pub. No.: WO2021/084084
PCT Pub. Date: May 6, 2021

(65) Prior Publication Data
US 2022/0409499 A1   Dec. 29, 2022

(30) Foreign Application Priority Data

Oct. 31, 2019 (EP) ..................................... 19206512

(51) Int. Cl.
| A61K 8/22 | (2006.01) |
| A61K 8/23 | (2006.01) |
| A61K 8/362 | (2006.01) |
| A61K 8/44 | (2006.01) |
| A61Q 5/04 | (2006.01) |
| A61Q 5/08 | (2006.01) |
| A61Q 5/10 | (2006.01) |

(52) U.S. Cl.
CPC .................. *A61K 8/22* (2013.01); *A61K 8/44* (2013.01); *A61Q 5/08* (2013.01); *A61K 2800/48* (2013.01)

(58) Field of Classification Search
None
See application file for complete search history.

(56) References Cited

U.S. PATENT DOCUMENTS

| 2007/0231277 A1 | 10/2007 | Sharma et al. |
| 2015/0034119 A1 | 2/2015 | Pressly et al. |
| 2015/0037270 A1 | 2/2015 | Pressly et al. |
| 2017/0165161 A1 | 6/2017 | Manneck et al. |
| 2017/0181946 A1 | 6/2017 | Manneck et al. |
| 2017/0216174 A1 | 8/2017 | Aeby et al. |
| 2017/0340553 A1 | 11/2017 | Anderheggen et al. |
| 2018/0116930 A1 | 5/2018 | Degeorge et al. |
| 2018/0338893 A1 | 11/2018 | Noecker et al. |
| 2018/0340107 A1 | 11/2018 | Noecker et al. |
| 2018/0353404 A1 | 12/2018 | Noecker et al. |
| 2019/0201309 A1 | 7/2019 | Machover et al. |
| 2020/0094084 A1 | 3/2020 | Flohr |
| 2020/0323755 A1 | 10/2020 | Manneck et al. |
| 2020/0330348 A1 | 10/2020 | Manneck et al. |
| 2020/0375860 A1 | 12/2020 | Manneck et al. |

FOREIGN PATENT DOCUMENTS

| DE | 10 2015 225 137 A1 | 6/2017 |
| DE | 10 2016 209 464 A1 | 11/2017 |
| DE | 10 2016 209 468 A1 | 11/2017 |
| JP | 2009-532374 A | 9/2009 |
| JP | 2017-522351 A | 8/2017 |
| WO | WO 2007/105849 A1 | 9/2007 |
| WO | WO 2015/017768 A1 | 2/2015 |
| WO | WO 2017-041903 A1 | 3/2017 |
| WO | WO 2017/041905 A1 | 3/2017 |
| WO | WO 2017/041907 A1 | 3/2017 |
| WO | WO 2017/041908 A1 | 3/2017 |
| WO | WO 2017/207630 A1 | 12/2017 |
| WO | WO 2017/207631 A1 | 12/2017 |
| WO | WO 2018/085478 A1 | 5/2018 |
| WO | WO 2018/191362 A1 | 10/2018 |
| WO | WO 2019/195901 A1 | 10/2019 |

OTHER PUBLICATIONS

Vanderbilt University:([website: https://www.vanderbilt.edu/AnS/Chemistry/Rizzo/stuff/AA/AminoAcids.html, Oct. 31, 2016]). (Year: 2016).*
International Search Report and Written Opinion issued Feb. 9, 2021 in PCT/EP2020/080538, filed on Oct. 30, 2020, 12 pages.
Extended European Search Report issued Apr. 28, 2020 in European Application 19206512.6, filed on Oct. 31, 2019, 11 pages (with Written Opinion).

* cited by examiner

*Primary Examiner* — Kyung S Chang
(74) *Attorney, Agent, or Firm* — Oblon, McClelland, Maier & Neustadt, L.L.P.

(57) ABSTRACT

An aqueous oxidizing compositions comprising one or more amino acids and hydrogen peroxide are described. The aqueous oxidizing compositions reduce hair damage during chemical services. The effect of hair damage reduction was found to be further improved when polycarboxylic acids were added to bleaching powder, oxidative dyeing, and permanent waving compositions.

11 Claims, No Drawings

AQUEOUS OXIDIZING COMPOSITION COMPRISING AMINO ACIDS

CROSS-REFERENCE TO RELATED APPLICATIONS

The present application is a 35 U.S.C. § 371 national stage application of International patent application PCT/EP2020/080538, filed Oct. 30, 2020, which is based on and claims the benefit of priority to European Application No. 19206512.6, filed Oct. 31, 2019. The entire contents of these applications are incorporated herein by reference.

FIELD OF THE INVENTION

The present invention relates to aqueous oxidizing compositions comprising amino acids. This composition is useful as second composition. Furthermore, two-part bleaching and oxidative dyeing compositions as well as methods are disclosed where the first composition further comprises polycarboxylic acids. A kit-of-parts is also disclosed comprising the inventive composition.

BACKGROUND OF THE INVENTION

Aqueous, hydrogen peroxide-containing compositions are well known in the art. These compositions are essential components in many industrial and artisanal processes. For example, bleaching or dyeing of solid substrates require the presence of oxidizing compositions. In particular, paper, wool, and cosmetic industry rely on the performance of these compositions.

However, as applying oxidative compositions onto biological materials leads to chemical damage, there has been an increasing trend to reduce the amount of damage conferred to the material.

A series of patent applications (US2015/0034119, US2015/0037270, WO2015/017768) discloses methods which claim benefits of the combined use of a bismaleate based binding agent in hair chemical treatments such as oxidative hair dyeing, permanently shaping, and bleaching for improving of hair structure. The publications are silent on the core of the present invention.

Furthermore, the application of polycarboxylic acids and amino acids in bleaching powder is known from WO2018/085478.

In any case, the literature is silent on the core of the present invention.

SUMMARY OF THE INVENTION

Therefore, the first object of the present invention is an aqueous oxidizing composition B having a pH in the range of 1 to 6 comprising:
  a) hydrogen peroxide,
  b) one or more amino acid(s) with a molar mass of 120 g/mol or less, and/or their salt(s), and/or their mixtures.

The second object of the present invention is a two-part bleaching composition comprising:
  a first bleaching powder composition A comprising
    c) one or more persalt(s) and/or peroxy salt(s),
    d) one or more alkalizing agent(s),
    e) one or more polycarboxylic acid(s), and/or their salt(s),
  a second aqueous oxidizing composition B as defined above.

The third object of the present invention is a two-part oxidative dyeing composition comprising:
  a dyeing composition C having a pH in the range of 7 to 12 and comprising one or more oxidative dye precursor(s) and/or oxidative dye couplers, and one or more alkalizing agent(s),
  a second aqueous oxidizing composition B as defined above.

The fourth object of the present invention is a kit-of-parts comprising the aqueous oxidizing composition B as defined above and one more composition selected from:
  a bleaching powder composition A as defined above,
  an oxidative dyeing composition C having a pH in the range of 7 to 12 and comprising one or more oxidative dye precursors and/or oxidative dye couplers, and one or more alkalizing agent(s),
  an aqueous permanent waving composition D having a pH in the range of 7 to 12 and comprising one or more reducing agent(s) and one or more alkalizing agent(s).

The fifth object of the present invention is a method for bleaching and/or oxidative dyeing of keratin fibers, preferably human keratin fibers, more preferably human hair, comprising the steps of:
  i) providing a bleaching powder composition A as defined in the above and a second aqueous oxidizing composition B as defined in the above,
  ii) optionally providing an oxidative dyeing composition C as defined above,
  iii) mixing the two compositions of step i) and optionally with the third oxidative dyeing composition C to yield a ready-to-use composition having a pH in the range of 7 to 12,
  iv) applying the ready-to-use mixture onto keratin fibers and leaving it for a time period of 1 min to 60 min,
  v) rinsing-off the keratin fibers and optionally shampooing the keratin fibers.

The sixth object of the present invention is a method for oxidative dyeing of keratin fibers, preferably human keratin fibers, more preferably human hair, comprising the steps of:
  vi) providing an oxidative dyeing composition C as defined above and a second aqueous oxidizing composition B as defined above,
  vii) mixing the two compositions of step vi) to yield a ready-to-use composition having a pH in the range of 7 to 12,
  viii) applying the ready-to-use mixture onto keratin fibers and leaving it for a time period of 1 min to 60 min,
  ix) rinsing-off the keratin fibers and optionally shampooing the keratin fibers.

The seventh object of the present invention is a method for permanently shaping keratin fibers, preferably human keratin fibers, more preferably human hair, comprising the steps of:
  x) optionally shampooing the keratin fibers,
  xi) putting keratin fibers under mechanical tension,
  xii) applying to keratin fibers an aqueous permanent waving composition D as defined in above, and leaving the composition for a time period in the range of 1 min to 60 min,
  xiii) optionally rinsing off the composition,
  xiv) providing an aqueous oxidizing composition B as defined above, applying it to keratin fibers and leaving it for a time period in the range of 1 min to 30 min,
  xv) releasing mechanical tension from keratin fibers, xvi) rinsing off the keratin fibers and optionally shampooing the keratin fibers, with the provision that steps xi) and xii) as well as steps xv) and xvi) may be performed in any order.

DETAILED DESCRIPTION OF THE INVENTION

Inventors of the present invention have unexpectedly found out that adding amino acids to an aqueous oxidizing composition leads to less damage of keratin fibers. Thus, cosmetic properties of keratin fibers such as touch, feel, shine, and color evenness, and bleaching power was improved. The effect was further found to be improved by adding polycarboxylic acids to second compositions such as bleaching powder, oxidative dyeing compositions, and perming compositions.

Aqueous Oxidizing Composition

The invention is directed to an aqueous oxidizing composition B having a pH in the range of 1 to 6 comprising:
a) hydrogen peroxide,
b) one or more amino acid(s) with a molar mass of 120 g/mol or less, and/or their salt(s), and/or their mixtures.

It is preferred from the viewpoint of bleaching/dyeing/perming performance after mixing with a first composition that the total concentration of compound a) is 1% by weight or more, more preferably 2% by weight or more, further more preferably 3% by weight or more, calculated to the total weight of the aqueous oxidizing composition B.

It is preferred from the viewpoint of bleaching/dyeing/perming performance after mixing with a first composition and cosmetic safety that the total concentration of compound a) is 20% by weight or less, more preferably 15% by weight or less, further more preferably 12% by weight or less, calculated to the total weight of the aqueous oxidizing composition B.

For attaining the above-mentioned effects, it is preferred that the total concentration of compound a) is in the range of 1% to 20% by weight, more preferably in the range of 2% to 15% by weight, further more preferably in the range of 3% to 12% by weight, calculated to the total weight of the aqueous oxidizing composition B.

It is preferred from the viewpoint of cosmetic safety that one or more amino acid(s) as compound according to b) is selected from alanine, glycine, arginine, histidine, lysine, aspartic acid, glutamic acid, serine, threonine, proline, valine, isoleucine, leucine, phenylalanine, tyrosine, tryptophane, and/or their salt(s), and/or their mixtures.

It is preferred from the viewpoint of hair penetration that one or more compound according to b) has a molar mass of 120 g/mol or less, preferably the compound is selected from alanine and/or glycine, and/or their salt(s), and/or their mixtures.

It is preferred from the viewpoint of hair damage that the total concentration of compounds according to b) is 0.01% by weight or more, further more preferably 0.03% by weight or more, further more preferably 0.05% by weight or more, calculated to the total weight of the composition B.

It is preferred from the viewpoint of hair damage and economic reasons that the total concentration of compounds according to b) is 0.7% by weight or less, further more preferably 0.5% by weight or less, further more preferably 0.5% by weight or less, calculated to the total weight of the composition B.

For attaining the above-mentioned effects it is preferred that the total concentration of compounds according to b) is in the range of 0.01% to 0.7% by weight, preferably in the range of 0.03% to 0.5% by weight, further more preferably in the range of 0.05% to 0.3% by weight, calculated to the total weight of the composition B.

The aqueous oxidizing composition has a pH in the range of 1 to 6.

It is preferred from the viewpoint of storage stability and cosmetic safety that the pH of the composition is 1.5 or more, preferably 2 or more, further more preferably 2.5 or more.

It is preferred from the viewpoint of storage stability that the pH of the composition is 5 or less, preferably 4.5 or less, further more preferably 4 or less.

For attaining the above-mentioned effects, it is preferred that the pH of the composition is in the range of 1.5 to 5, preferably in the range of 2 to 4.5, more preferably in the range of 2.5 to 4.

Form of Aqueous Oxidizing Composition

The aqueous oxidizing composition B of the present invention preferably is an emulsion, thickened gel, or a combination thereof, from the viewpoint of cosmetic safety as well as user friendliness.

Lipophilic Compounds as Compounds According to f)

In case the composition of the present invention is formulated as an emulsion and/or thickened emulsion, it is preferred that the composition comprises one or more lipophilic compound(s) as compound(s) according to f).

Preferably, compounds according to f) are selected from $C_{12}$ to $C_{22}$ fatty alcohols, esters of $C_3$ to $C_{22}$ alcohols with $C_{12}$ to $C_{22}$ fatty acids, $C_8$ to $C_{22}$ fatty acids, vegetable oils, and/or silicones, and/or hydrocarbon-based products, and/or their mixtures, from the viewpoint of cosmetic compatibility.

Suitable $C_{12}$ to $C_{22}$ fatty alcohols are myristyl alcohol, cetyl alcohol, stearyl alcohol, behenyl alcohol, and cetearyl alcohol.

Suitable esters of $C_3$ to $C_{22}$ alcohols with $C_{12}$ to $C_{22}$ fatty acids are isopropyl myristate, isopropyl palmitate, and myristyl myristate.

Suitable $C_8$ to $C_{22}$ fatty acids are oleic acid, linoleic acid, and palmitic acid.

Suitable vegetable oils are olive oil, almond oil, sunflower oil, and argan oil.

Suitable silicones are non-aminated and/or aminated silicones. The latter are commonly known as amodimethicones.

It is preferred from the viewpoint of forming a stable composition and user friendliness that the total concentration of compounds according to f) is 1% by weight or more, more preferably 2% by weight or more, further more preferably 3% by weight or more, calculated to the total weight of the composition B.

It is preferred from the viewpoint of forming a stable composition that the total concentration of compounds according to f) is 20% by weight or less, more preferably 15% by weight or less, further more preferably 12% by weight or less, calculated to the total weight of the composition B.

For attaining the above-mentioned effects, the total concentration of compounds according to f) is in the range of 1% to 20% by weight, preferably in the range of 2% to 15% by weight, more preferably in the range of 3% to 12% by weight, calculated to the total weight of the composition B.

Surfactants as Compounds According to g)

The composition B of the present invention may further comprise one or more surfactant(s) as compound according to g), preferably selected from non-ionic surfactants, anionic surfactants, cationic surfactants, and/or amphoteric/zwitterionic surfactants, and/or their mixtures, more preferably selected from anionic surfactants, from the viewpoint of stabilizing the composition and improving wettability and mixability.

Preferably, the anionic surfactants may be selected from ethoxylated or non-ethoxylated alkyl ether sulfate surfactants, alkyl sulfates, ethoxylated and/or non-ethoxylated alkyl carboxylates, ethoxylated or non-ethoxylated amino acid surfactants, and/or their mixtures, and/or their salts.

Suitable examples are alkyl sulfate or preferably ethoxylated alkyl ether sulfate surfactants or mixtures thereof, and/or salts thereof, having an alkyl chain length of $C_{10}$ to $C_{22}$ and an ethoxylation degree from 1 to 50.

Suitable non-ionic surfactants may be selected from alkyl polyglycosides, ethoxylated triglycerides, ethoxylated fatty alcohols, ethoxylated fatty acid esters, and/or their mixtures.

Suitable cationic surfactants are quaternary ammonium surfactants having a carbon chain length in the range of $C_{12}$ to $C_{22}$ or surfactants having a tertiary amine group and at least one alkyl chain having a carbon chain length in the range of $C_{12}$ to $C_{22}$ such as alkylamidoalkylamine surfactants, and/or their salts. Suitable examples are cetrimonium chloride and behentrimonium chloride.

Suitable amphoteric/zwitterionic surfactants are of betaine type. Suitable compounds may be selected from alkyl betaines and/or alkylamido betaines. A preferred compound selected from alkyl betaines is lauryl betaine. A preferred compound selected from alkylamido betaines is cocamidopropyl betaine. The disclosure also relates to the salts of the compounds.

Suitable concentration ranges for surfactants are in the range of 0.1% to 10% by weight, calculated to the total weight of the composition B, from the viewpoint of enhancing wettability of keratin fibers, physical stability, and mixability with other compositions.

Thickening Polymers

From the viewpoint of cosmetic safety, it is further preferred that the composition B of the present invention comprises one or more thickening polymer.

The composition B of the present invention comprises one or more thickening polymer(s) selected from non-ionic thickening polymers and/or anionic thickening polymers, and/or their mixtures.

Preferably, the thickening polymers are selected from polymers resulting in an aqueous solution and/or aqueous dispersion at pH between 1 and 6 having a viscosity of at least 1,000 mPa·s measured at a polymer concentration of 1% by weight in water at 25° C., calculated to the total weight of the composition, determined by a Brookfield viscometer, such as at 10 rpm for 1 min, with an appropriate spindle at 25° C.

Suitable non-ionic thickening polymers are cellulose-based polymers. Suitable examples of cellulose-based polymers are methylcellulose, hydroxymethylcellulose, hydroxyethylcellulose, hydroxypropylcellulose, hydroxyethyl-methylcellulose, and alkylated hydroxyl celluloses such as ($C_2$-$C_8$)-alkylcelluloses or cetyl hydroxyethylcellulose.

Suitable anionic thickening polymers are selected from naturally-based anionic polymers and/or synthetic anionic polymers.

Suitably, the natural anionic polymer(s) may be selected from xanthan gum, dehydroxanthan gum, hydroxypropylxanthan gum, carboxymethyl cellulose and starch based polymers such as vegetable starch and/or their synthetically modified derivatives such as hydroxypropyl starch phosphate. Equally suitable are alginic acids, sodium alginates, ammonium alginates, calcium alginates, gum arabic, and guar gum.

Suitable synthetic anionic polymers are associative thickening polymers, such as acrylates/steareth-30 methacrylate copolymer.

The preferred thickening polymer for the composition of the present invention are natural anionic polymers, more preferably xanthan gum and/or dehydroxanthan gum, from the viewpoint of their biodegradability and low environmental impact.

Preferably, the total concentration of thickening polymers of the present invention are 0.1% by weight or more, more preferably 0.25% by weight or more, more preferably 0.5% by weight or more, calculated to the total weight of the composition B, from the viewpoint of providing sufficient viscosity to the composition.

Preferably, the total concentration of thickening polymers of the present invention are 15% by weight or less, more preferably 12% by weight or more, further more preferably 10% by weight or less, calculated to the total weight of the composition B, from the viewpoint of providing sufficient viscosity to the composition and cost of goods.

For attaining the above-mentioned effects, it is preferred that the total concentration of thickening polymers in the composition B of the present invention is in the range of 0.1% to 15% by weight, preferably in the range of 0.25% to 12% by weight, more preferably in the range of 0.5% to 10% by weight, calculated to the total weight of the composition B.

It is preferred from the viewpoint of cosmetic safety that the composition of the present invention has a viscosity in the range of 1,000 Pas to 25,000 mPas, preferably 2,000 mPas to 20,000 mPas, more preferably in the range of 2,500 mPas to 17,500 mPas, determined by cone plate viscometry at 25° C. under atmospheric conditions. A suitable viscometer is a Brookfield viscometer with spindle #4.

Two-Part Bleaching Composition

The present invention is also directed to a two-part bleaching composition comprising:
    a first bleaching powder composition A comprising
        c) one or more persalt(s) and/or peroxy salt(s),
        d) one or more alkalizing agent(s),
        e) one or more polycarboxylic acid(s), and/or their salt(s),
    a second aqueous oxidizing composition B as defined above.

The bleaching powder composition A comprises one or more persalt(s) and/or peroxy salt(s).

Suitable persalts and/or peroxy salts are sodium persulfate, potassium persulfate, ammonium persulfate, earth alkali peroxides such as magnesium peroxide, melamine peroxide or urea peroxide or phthalimidoperoxy hexanoic acid. The preferred persalts from the viewpoint of bleaching power are sodium, potassium and ammonium persulfate.

It is preferred from the viewpoint of bleaching power and cosmetic safety that the total concentration of persalts and/or peroxy salts in the bleach powder composition is in the range of 10% to 80% by weight, preferably in the range of 15% to 70% by weight, more preferably in the range of 20% to 60% by weight, and still more preferably in the range of 25% to 60% by weight, calculated to the total weight of the bleach powder composition A.

The bleaching powder composition A comprises one or more alkalizing agent(s) as compound(s) according to d).

In case composition A is a bleach powder composition, it comprises one or more alkalizing agent(s), preferably at a total concentration in the range of 0.25% to 30% by weight, more preferably 0.5% to 25% by weight, further more preferably 1% to 20% by weight, calculated to the total weight of bleaching powder composition A, from the viewpoint of providing sufficient alkalinity.

Suitable alkalizing agent(s) are metasilicates, in particular sodium metasilicate. It is preferred from the viewpoint of alkalinity that the concentration of metasilicates in the bleach powder composition A is in the range of 1% to 20% by weight, more preferably 5% to 15% by weight, calculated to the total weight of the bleach powder composition A.

Other suitable alkalizing agent(s) are carbonate and bicarbonate alkali salts such as sodium, potassium, and ammonium salts. The preferred salts are bicarbonate salts and especially preferred is ammonium bicarbonate, from the viewpoint of buffer capacity. Suitable concentration of carbonates in the bleach powder composition A is in the range of 0.25% to 10% by weight, preferably in the range of 0.5% to 7.5% by weight, more preferably in the range of 0.75% to 5% by weight, and still more preferably in the range of 1% to 4% by weight, calculated to the total weight of the bleach powder composition A, from the viewpoint of buffer capacity and low hair damage.

The bleaching powder composition A comprises one or more polycarboxylic acid(s), and/or their salt(s) as compound(s) according to e).

Preferred polycarboxylic acid(s), and/or their salt(s), as compound(s) according to e) have 2 or more carboxyl groups, more preferably it is selected from malic acid, oxalic acid, malonic acid, succinic acid, fumaric acid, adipic acid, maleic acid, glutaric acid, ethylene diaminotetraacetic acid, pyromellitic acid, and/or their salt(s), and/or their mixtures, from the viewpoint of hair damage reduction.

It is further preferred that one or more polycarboxylic acid(s) as compound(s) according to e) have 2 carboxyl groups, more preferably it is selected from malic acid, oxalic acid, malonic acid, succinic acid, fumaric acid, adipic acid, maleic acid, glutaric acid, and/or their salt(s), and/or their mixture(s), from the viewpoint of hair damage reduction, commercial availability, and cosmetic safety.

The most preferred compound according to e) is malic acid and/or its salt(s), from the viewpoint of hair damage reduction.

It is preferred from the viewpoint hair damage reduction that the total concentration of compounds according to e) in the bleaching powder composition A is in the range of 0.01% by weight or more, more preferably 0.05% by weight or more, further more preferably 0.1% by weight or more, calculated to the total weight of the bleaching powder composition A.

It is preferred from the viewpoint hair damage reduction that the total concentration of compounds according to e) in the bleaching powder composition A is in the range of 5% by weight or less, more preferably 2.5% by weight or less, further more preferably 1% by weight or less, calculated to the total weight of the bleaching powder composition A.

For attaining the above-mentioned effect, it is preferred that the total concentration of compounds according to e) in the first bleaching powder composition A is in the range of 0.01% to 5% by weight, preferably 0.05% to 2.5% by weight, more preferably 0.1% to 1% by weight, calculated to the total weight of the bleaching powder composition A.

Two-Part Oxidative Dyeing Composition

The present invention is also directed to a two-part oxidative dyeing composition comprising:

a dyeing composition C having a pH in the range of 7 to 12 and comprising one or more oxidative dye precursor(s) and/or oxidative dye couplers, and one or more alkalizing agent(s), a second aqueous oxidizing composition B as defined above.

It is preferred from the viewpoint of hair damage reduction that compositions C comprises one or more compound(s) according to e) as defined above, and/or their salt(s), and/or their mixtures. The same concentrations and conditions apply as disclosed for composition A.

The oxidative dyeing composition C has a pH in the range of 7 to 12 and comprises one or more oxidative dye precursor(s) and/or oxidative dye couplers, and one or more alkalizing agent(s).

It is preferred from the viewpoint of dyeing performance that the pH of the oxidative dyeing composition C preferably is 7.5 or more, more preferably 8.0 or more, further more preferably 8.5 or more.

It is preferred from the viewpoint of cosmetic safety and dyeing performance that the pH of the dyeing composition C preferably is 11 or less, more preferably 10.5 or less, further more preferably 10.0 or less.

For attaining the above-mentioned effects, it is preferred that the pH of the of the oxidative dyeing composition C is in the range of 7.5 to 11, more preferably 8.0 to 10.5, further more preferably 8.5 to 10.0.

The oxidative dying composition C comprises one or more oxidative dye precursors and/or oxidative dye couplers.

Suitable oxidative dye precursors are, for example, p-phenylendiamine and/or its derivatives, p-aminophenol and/or its derivatives, and heterocyclic compounds such as diaminopyrazols and substituted pyrimidines and/or their derivatives.

Example oxidative dye precursors are p-phenylenediamine, p-aminophenol, 2,5-diamino-toluene, 2-n-propyl or 2-ethyl-p-phenylenediamine, 2,6-di-methyl-p-phenylene-diamine, 2-(2,5-diaminophenyl) ethanol, 1-amino-4-bis-(2'-hydroxy-ethyl)amino-benzene, 2-(2-hydroxyethyl amino)-5-aminotoluene, 4,4'-diaminodiphenylamine, 4-aminodiphenylamine, 2-amino-5-N,N-diethyl aminotoluene, 4-amino-N-ethyl-N-isopropyl aniline, 2-chloro-p-phenylenediamine, 1-β-hydroxyethyl-2,5-diamino-4-chlorobenzene, 1-β-hydroxyethyl-2,5-diamino-4-methyl benzene, 2-methoxy-p-phenylenediamine, N,N-diethyl-p-phenylenediamine, 1-amino-4-β-methoxyethyl aminobenzene, 1-dimethyl-amino-4-aminobenzene, 1-hydroxy-2,5-diamino-4-methyl benzene, 1-hydroxymethyl-2,5-diaminobenzene, 1,3-dimethyl-2,5-diaminobenzene, 1,4-diamino isopropyl benzene and/or 1-amino-4-β-hydroxypropyl aminobenzene, 1-hydroxyethyl-4,5-diaminopyrazole, 3,4-diamino-5-hydroxypyrazole, 3,5-diaminopyrazole, 3,5-diamino pyrazol-1-carboxamide, 3-amino-5-hydroxypyrazole, 1-phenyl-2-methyl pyrazole, 1-phenyl-3-methylpyrazole-5-one, 3,5-dimethylpyrazole, 3,5-dimethylpyrazole-1-methanol, 3,5-diamino-1,2,4-triazole, 4-aminophenol and the derivatives thereof such as 4-amino-3-methylphenol, 2-chloro-4-aminophenol, 2,6-dichloro-4-aminophenol, 2,4-diamino-phenol, 2,6-dibromo-4-aminophenol, tetraamino pyrimidines, triaminohydroxy pyrimidines, diaminomono- and -dihydroxy pyrimidines, aminotriazines, 5-amino salicylic acid and/or 1,2,4-triamino benzene, 2,5-diaminopyridine, 2,3-diaminopyridine, 2,6-diaminopyridine, 3-amino-2-methyl amino-6-methoxypyridine, 2-dimethyl-5-aminopyridine, 2-dimethyl aminoethyl-3-hydroxypyridine, 2-amino-4,6-dimethyl pyridine, 2-amino-3-hydroxypyridine, 3-amino-2(β-hydroxyethyl amino)-6-methoxy pyridine, 2,6-dimethyl amino-5-aminopyridine, 2-di(hydroxyethyl) amino-5-aminopyridine, 2-hydroxyethyl amino-5-aminopyridine, 4-hydroxy-2,5,6-triaminopyrimidine and/or the water-soluble salts thereof, and/or their mixtures.

Suitable oxidative dye couplers are resorcinol and/or its derivatives, m-aminophenol and/or its derivatives, m-phenylenediamine and/or its derivatives, pyridines and/or its derivatives, and naphthole and/or its derivatives.

Examples for oxidative dye couplers are 5-amino-2-methylphenol, 2-methyl-5-hydroxyethylaminophenol, 2,4-diaminophenoxyethanol, 2-amino-4-hydroxyethylaminoanisol, 2-methyl-5-amino-6-chlorphenol, 1,3-bis(2,4-diaminophenoxy)propane, 2-bis(2-hydroxyethyl) aminotoluene, 2-amino-5-methylphenol, resorcinol, 2-methyl-resorcinol, 4-chlororesorcinol, 2-amino-4-chlorophenol, 5-amino-4-methoxy-2-methylphenol, 2-aminophenol, 3-amino-phenol, 1-methyl-2-hydroxy-4-aminobenzene, 3-N,N-dimethyl aminophenol, 2,6-dihydroxy-3,5-dimethoxypyridine, 5-amino-3-methylphenol, 6-amino-3-methylphenol, 1,3-diamino-benzene, 1-amino-3-(2'-hy-droxyethylamino)benzene, 1-amino-3-[bis(2'-hydroxy-ethyl) amino] benzene, α-naphthol, 4,6-dichlororesorcinol, 1,3-diamino-toluene, 4-hydroxy-1,2-methylenedioxy benzene, 1,5-dihydroxy naphthalene, 1,6-dihydroxy naphthalene, 1,7-dihydroxy naphthalene, 2,7-dihydroxy naphthalene, 1-hydroxy-2-methyl naphthalene, 4-hydroxy-1,2-methyldioxy benzene, 2,4-diamino-3-chlorophenol, 5-amino-2-methoxyphenol and/or 1-methoxy-2-amino-4-(2'-hydroxyethyl amino)-benzene or the water-soluble salts thereof, and mixture thereof.

The suitable total concentration of oxidative dye precursors and/or oxidative dye couplers is in the range of 0.001% to 5% by weight, preferably 0.01% to 4% by weight, more preferably 0.05% to 3% by weight, still more preferably 0.1% to 2% by weight, calculated to the total weight of the oxidative dyeing composition C.

The oxidative dyeing composition C comprises one or more alkalizing agent. Preferably, one or more alkalizing agent(s) is selected from ammonia, alkyl- or alkanolamines according to the general structure

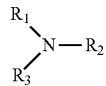

wherein $R_1$, $R_2$, and $R_3$ are same or different from H, preferably selected from $C_1$ to $C_4$, $C_3$ to $C_4$ unsaturated alkyl, $C_3$ to $C_4$ branched alkyl, $C_1$ to $C_4$ hydroxyl alkyl, $C_3$ to $C_4$ unsaturated hydroxyl alkyl, $C_3$ to $C_4$ branched hydroxyl alkyl, with the condition that at least one of $R_1$, $R_2$, or $R_3$ is different from H, from the viewpoint of cosmetic safety and dyeing performance.

It is preferred from the viewpoint of dyeing intensity that the alkalizing agent is selected from ammonia and/or its salts, monoethanolamine and/or its salts, and/or 2-aminomethyl propanol, and/or their mixtures.

It is further preferred from the viewpoint of sufficient alkalinity and dyeing intensity that the concentration of alkalizing agents in the oxidative dyeing composition A before mixing is in the range of 0.25% to 15%, more preferably 0.5% to 12.5%, still more preferably 0.75% to 10%, and still more preferably 1% to 7.5% by weight, calculated to the total weight of the oxidative dyeing composition C before mixing.

The oxidative dyeing composition may be in the form of a thickened gel, an emulsion, or a thickened emulsion.

For forming an emulsion, the oxidative dyeing composition C may comprise one or more lipophilic compound according to f), as disclosed in detail for the aqueous oxidative composition.

For forming a thickened gel and/or a thickened emulsion, the oxidative dyeing composition C may further comprise a thickening polymer, as disclosed for the aqueous oxidative composition.

Furthermore, from the viewpoint of wettability and formulation stability, the oxidative dyeing composition C may further comprise one or more surfactant(s) as compound according to g), as disclosed for the aqueous oxidizing composition.

Ready-to-Use Mixture and Method for Bleaching/Oxidative Dyeing

The present invention is also directed to a method for bleaching and/or oxidative dyeing of keratin fibers, preferably human keratin fibers, more preferably human hair, comprising the steps of:
  i) providing a bleaching powder composition A as defined above and a second aqueous oxidizing composition B as defined above,
  ii) optionally providing an oxidative dyeing composition C as defined above,
  iii) mixing the two compositions of step i) and optionally with the third oxidative dyeing composition C to yield a ready-to-use composition having a pH in the range of 7 to 12,
  iv) applying the ready-to-use mixture onto keratin fibers and leaving it for a time period of 1 min to 60 min,
  v) rinsing-off the keratin fibers and optionally shampooing the keratin fibers.

The bleach powder composition A is mixed with the aqueous oxidizing composition of B to form a ready-to-use composition. Suitable mixing ratios by weight are 5:1 to 1:5 (bleach powder composition A: aqueous oxidizing composition B). Customarily, suitable mixing ratios are 1:1, 1:2, and 1:3 by weight (bleach powder composition A: aqueous oxidizing composition B).

The oxidative dyeing composition C may be mixed with the aqueous oxidizing composition B and the bleaching powder composition A to form a ready-to-use composition. Suitable mixing ratios by weight are 5:1:0.1 to 1:5:3 (oxidative dyeing composition C: aqueous oxidizing composition B: bleaching powder composition A). Customarily, suitable mixing ratios are 1:1:2, 1:2:2, and 1:3:1 by weight (oxidative dyeing composition C: aqueous oxidizing composition B: bleaching powder composition A).

Suitably, the pH of the ready-to-use composition is in the range of 7 to 12. It is preferred from the viewpoint of accelerated dyeing that the pH of the ready-to-use composition is in the range of 7.5 to 11, more preferably 8.0 to 10.5.

The ready-to-use composition is then applied to keratin fibers and left for a time period of 1 min to 60 min as defined in step ii). Preferred time ranges for step ii) are 5 min to 45 min, more preferred ranges are 10 min to 35 min, from the viewpoint of sufficiently dyeing the keratin fibers.

During step ii) and after applying the ready-to-use composition, heat may be applied from the viewpoint of accelerating oxidative dyeing. Suitable temperature ranges are 30° C. to 50° C., from the viewpoint of oxidative dyeing speed and cosmetic safety.

After that, the ready-to-use composition is rinsed-off from keratin fibers and optionally they are shampooed and optionally blow-dried.

Ready-to-Use Mixture and Method for Oxidative Dyeing

The present invention is also directed to a method for oxidative dyeing of keratin fibers, preferably human keratin fibers, more preferably human hair, comprising the steps of:
vi) providing an oxidative dyeing composition C as defined above and a second aqueous oxidizing composition B as defined above,
vii) mixing the two compositions of step vi) to yield a ready-to-use composition having a pH in the range of 7 to 12,
viii) applying the ready-to-use mixture onto keratin fibers and leaving it for a time period of 1 min to 60 min,
ix) rinsing-off the keratin fibers and optionally shampooing the keratin fibers.

The oxidative dyeing composition C is mixed with the aqueous oxidizing composition of B to form a ready-to-use composition. Suitable mixing ratios by weight are 5:1 to 1:5 (oxidative dyeing composition C: aqueous oxidizing composition B). Customarily, suitable mixing ratios are 1:1, 1:2, and 1:3 by weight (oxidative dyeing composition C: aqueous oxidizing composition B).

Suitably, the pH of the ready-to-use composition is in the range of 7 to 12. It is preferred from the viewpoint of accelerated dyeing that the pH of the ready-to-use composition is in the range of 7.5 to 11, more preferably 8.0 to 10.5.

The ready-to-use composition is then applied to keratin fibers and left for a time period of 1 min to 60 min as defined in step viii). Preferred time ranges for step viii) are 5 min to 45 min, more preferred ranges are 10 min to 35 min, from the viewpoint of sufficiently dyeing the keratin fibers.

During step viii) after applying the ready-to-use composition, heat may be applied from the viewpoint of accelerating oxidative dyeing. Suitable temperature ranges are 30° C. to 50° C., from the viewpoint of oxidative dyeing speed and cosmetic safety.

After that, the ready-to-use composition is rinsed-off from keratin fibers and optionally they are shampooed and optionally blow-dried.

Permanent Waving Method

The present invention is also directed to a method for permanently shaping keratin fibers, preferably human keratin fibers, more preferably human hair, comprising the steps of:
x) optionally shampooing the keratin fibers,
xi) putting keratin fibers under mechanical tension,
xii) applying to keratin fibers an aqueous permanent waving composition D as defined below, and leaving the composition for a time period in the range of 1 min to 60 min,
xiii) optionally rinsing off the composition,
xiv) providing an aqueous oxidizing composition as defined above, applying it to keratin fibers and leaving it for a time period in the range of 1 min to 30 min,
xv) releasing mechanical tension from keratin fibers,
xvi) rinsing off the keratin fibers and optionally shampooing the keratin fibers, with the provision that steps xi) and xii) as well as steps xv) and xvi) may be performed in any order. It is preferred that the other steps listed above except for steps xi) and xii) as well as steps xv) and xvi) are executed in exactly the listed order.

It is preferred from the viewpoint of hair damage reduction that compositions D comprises one or more compound(s) according to e) as defined above, and/or their salt(s), and/or their mixtures. The same concentrations and conditions apply as disclosed for composition A.

The term "permanent shaping" is to be understood as referring to permanent curling and permanent straightening.

Thus, mechanical tension as defined in step xi) is, for example, provided by putting the keratin fibers on curlers or by straightening the fibers by comb and brush.

The composition as defined in step xii) comprises one or more reducing agent(s). In principle, any inorganic or organic reducing agent and/or their mixtures are suitable for the purpose of the present invention.

Suitable inorganic reducing agents are sulfite and/or hydrogen sulfite salts such as sodium, potassium, and ammonium salts. Suitable organic reducing agents are thioglycolic acid and/or its salts, cysteamine and/or its salts, thioglycerin and/or its salts, glycerin esters of thioglycolic acid and/or its salts, thiolactic acid and/or its salts, cysteine or its derivatives and/or its salts, and/or their mixtures. Preferred are thioglycolic acid and/or its salts, thiolactic acid and/or its salts, cysteine or its derivatives and/or its salts and sodium, potassium, ammonium sulfites and their mixtures, form the viewpoint of cosmetic safety. The most preferred reducing agents are thioglycolic acid and/or its salts and sodium, potassium, ammonium sulfites, and/or their mixtures, form the viewpoint of cosmetic safety.

It is preferred that the total concentration of reducing agents in the composition of step xvii) is in the range of 0.5% to 20% by weight, more preferably 1% to 15% by weight, still more preferably 2% to 12% by weight, and still more preferably 3% to 10% by weight, calculated to the total weight of the composition of step xvii).

The pH of the composition may be acidic or alkaline and is in the range of 3 to 12, preferably 4 to 11, and most preferably it is alkaline and in the range of 7.5 to 10.5, from the viewpoint of reducing power. The pH may be adjusted with the known organic and/or inorganic acids and alkalizing agents (see above for dyeing and bleaching).

The composition of step xii) is left on the hair for a period of 1 to 60 min, preferably for a time period of 2 min to 45 min, more preferably for a time period of 5 min to 30 min, and further more preferably for a time period of 5 min to 20 min at ambient temperature. Optionally heat may be applied.

The inventive aqueous oxidizing composition is then applied to hair in step xiv) and left for a time period of 1 min to 30 min. It is preferred from the viewpoint of hair damage and oxidation performance that the composition is left on keratin fibers for 2 min to 25 min, more preferably for 3 min to 20 min, and further more preferably for 5 min to 15 min, optionally while applying heat and/or under use of heating device.

Kit-of-Parts

The present invention is also directed to a kit-of-parts comprising the aqueous oxidizing composition as defined above and one more composition selected from:
a bleaching powder composition A as defined above,
an oxidative dyeing composition C having a pH in the range of 7 to 12 and comprising one or more oxidative dye precursors and/or oxidative dye couplers, and one or more alkalizing agent(s), as defined above,
an aqueous permanent waving composition D having a pH in the range of 7 to 12 and comprising one or more reducing agent(s) and one or more alkalizing agent(s), as defined above.

It is preferred from the viewpoint of customer friendliness that the aforementioned compositions are separately packed.

It is preferred from the viewpoint of hair damage reduction that compositions C and/or D comprise one or more compound(s) according to e) as defined above, and/or their salt(s), and/or their mixtures.

The following examples are to illustrate the present invention, and not to limit it.

EXAMPLES

Example 1

The following aqueous oxidizing compositions were prepared by dissolving alanine as compound according to b) in an aqueous composition of hydrogen peroxide under constant stirring:

| Ingredient | Inventive composition 1 [% by weight] | Comparative composition 1 [% by weight] |
|---|---|---|
| Alanine | 0.3 | — |
| Hydrogen peroxide | 9.0 | |
| Phosphoric acid | q.s. ad pH 2.5 | |
| Water | Ad 100.0 | |

The following bleaching powder composition A was prepared comprising malic acid as compound according to e):

| | % by weight |
|---|---|
| Hydroxyethylcellulose | 3 |
| Tetrasodium EDTA | 2 |
| Malic acid | 0.5 |
| Sodium carbonate | 1 |
| Ammonium persulfate | 11 |
| Potassium persulfate | 36 |
| Sodium metasilicate | 10 |
| Mineral oil | 8 |
| Diatomaceous Earth | to 100 |

The aqueous oxidative compositions from above were mixed with a bleaching powder composition A in a weight ratio of 1:2 (bleaching powder composition A: aqueous oxidative composition) to yield a ready-to-use composition having a pH around 10.0.

2 g of compositions were applied onto human hair streaks (2 g per bundle, 21 cm long) and left for 30 min at 40° C. The hair streaks were then rinsed-off with lukewarm water, shampooed, and blow-dried.

The hair streaks were then touched by 5 independent experts and they were asked which hair streak they preferred from the viewpoint of touch. All experts favored the the hair streak that was bleached with the inventive composition.

Example 2

The following aqueous oxidizing compositions were prepared by dissolving amino acids as compound according to b) in an aqueous composition of hydrogen peroxide under constant stirring:

| Ingredient | Inventive comp. 2 | Inventive comp. 3 | Comparative comp. 2 |
|---|---|---|---|
| Alanine | — | 0.15 | — |
| Glycine | 0.3 | 0.15 | — |
| Lysine | — | — | 0.3 |
| Hydrogen peroxide | 9.0 | | |
| Phosphoric acid | q.s. ad pH 2.5 | | |
| Water | Ad 100.0 | | |

The compositions from above were then mixed with the bleaching powder of example 1 and human hair streaks were processed as described thereunder.

The hair streaks were then touched by 5 independent experts and they were asked which hair streak they preferred from the viewpoint of touch and to assign a rating from 1 to 3. The higher number represented the best result. The experts were not informed on the treatment group.

| Expert | Inventive comp. 2 | Inventive comp. 3 | Comparative comp. 2 |
|---|---|---|---|
| 1 | 3 | 1 | 1 |
| 2 | 3 | 2 | 1 |
| 3 | 2 | 2 | 3 |
| 4 | 3 | 2 | 1 |
| 5 | 3 | 3 | 2 |
| 6 | 3 | 3 | 2 |
| Average | 2.8 | 2.2 | 1.7 |

As a results, the experts preferred the hair streaks treated with the inventive compositions.

Example 3

| | % by weight |
|---|---|
| Glycine | 0.05 |
| Cetearyl alcohol | 4.0 |
| Sodium lauryl sulfate | 0.8 |
| Phosphoric acid | q.s. ad pH 1.5 |
| Tetrasodium EDTA | 0.05 |
| Hydrogen peroxide | 6.0 |
| Water | ad 100.0 |

The concentration of glycine as compound according to b) may also be adjusted to 0.05%, 0.1%, or 0.5% or any values in between to achieve the same technical effect.

The concentration of hydrogen peroxide may be adjusted to 9%, 12%, 15%, or 20% by weight, or any value in between.

Example 4

| | % by weight |
|---|---|
| Alanine | 0.01 |
| Cetearyl alcohol | 4.0 |
| Sodium lauryl sulfate | 0.8 |
| Phosphoric acid | q.s. ad pH 2.5 |
| Tetrasodium EDTA | 0.05 |
| Hydrogen peroxide | 6.0 |
| Water | ad 100.0 |

The concentration of alanine as compound according to b) may also be adjusted to 0.05%, 0.1%, or 0.5% or any values in between to achieve the same technical effect.

The concentration of hydrogen peroxide may be adjusted to 9%, 12%, 15%, or 20% by weight, or any value in between.

Example 5

|  | % by weight |
|---|---|
| Glycine | 0.1 |
| Alanine | 0.1 |
| Proline | 0.1 |
| Cetearyl alcohol | 4.0 |
| Sodium lauryl sulfate | 0.8 |
| Phosphoric acid | q.s. ad pH 3.0 |
| Tetrasodium EDTA | 0.05 |
| Hydrogen peroxide | 6.0 |
| Water | ad 100.0 |

The concentration of hydrogen peroxide may be adjusted to 9%, 12%, 15%, or 20% by weight, or any value in between.

Example 6

The following oxidative dyeing composition was prepared:

|  | % by weight |
|---|---|
| Cetearyl alcohol | 12 |
| Sodium cetearyl sulfate | 2 |
| Cocamide MEA | 5 |
| Oleic acid | 2 |
| Malic acid | 1 |
| Tetrasodium EDTA | 1 |
| Sodium sulfite | 1 |
| Ammonium hydroxide | 5 |
| Ammonium chloride | 1 |
| Toluene-2,5-Diamine sulfate | 0.75 |
| Resorcinol | 0.10 |
| 4-Chlorresorcinol | 0.25 |
| m-Aminophenol | 0.05 |
| 4-Amino-2-Hydroxytoluene | 0.05 |
| Fragrance | 0.5 |
| Water | ad 100 |

The above composition had a pH of 9.5.

The oxidative dyeing composition was then mixed with the inventive composition 1 and comparative composition 1 of example 1 stored in a weight ratio of 1:1 to yield a ready-to-use composition. The ready-to-use composition had a pH of around 9.5.

The ready-to-use compositions were applied to human hair and left for 30 min at room temperature. After that, the compositions were rinsed-off with water, the hair was shampooed, and blow-dried.

The hair was found to be intensely red-brown colored with the inventive composition 1 having a soft and cosmetic feel and better shine, whereas for the hair treated with comparative composition 1 the feel was poor and shine was less.

Example 7

The following permanent shaping composition was prepared:

|  | % by weight |
|---|---|
| Ammonium thioglycolate (60%) | 21.3 |
| Ammonium hydrogen carbonate | 5.0 |
| 1,3-butylene gylcol | 3.0 |
| Malic acid | 1.0 |
| Amodimethicone | 0.2 |
| PEG-40-Hydrogenated castor oil | 0.7 |
| Fragrance | 0.4 |
| Ammonia (25% active) | ad pH 8.0 |
| Water | ad 100.0 |

Human hair was shampooed and the hair was put under mechanical tension on curlers. Then the composition from above was applied to hair and left for 15 min at 40° C. The composition was then rinsed-off with water.

Then the inventive composition 1 and comparative composition 1 of example 1 and was applied to hair and left for 15 min at room temperature. Tension from hair was then released and the curlers were removed. The hair was then rinsed-off, shampooed, and blow-dried.

The hair was found to be intensely curled and had good cosmetic feeling with the inventive composition 1, whereas the streak treated with the comparative composition 1 had poor hair feel and less curling intensity.

The invention claimed is:
1. A cosmetic composition, comprising:
an aqueous oxidizing composition B having a pH in the range of 1 to 6, and comprising, relative to the total weight of composition B:
 a) 3-12 wt % hydrogen peroxide, and
 b) 0.01-0.5 wt % in total of one or more selected from the group consisting of alanine, glycine, a salt thereof, and a mixture thereof;
a bleaching powder composition A, comprising, relative to the total weight of composition A:
 c) 25-60 wt % in total of one or more persulfate salts selected from the group consisting of sodium persulfate, ammonium persulfate, and potassium sulfate,
 d) 5-15 wt % in total of one or more alkalizing agents selected from the group consisting of sodium metasilicate, sodium carbonate, potassium carbonate, and ammonium carbonate, and
 e) 1-5 wt % in total of one or more polycarboxylic acids selected from the group consisting of malic acid, oxalic acid, malonic acid, succinic acid, fumaric acid, adipic acid, maleic acid, glutaric acid, pyromelletic acid, and a salt thereof; and
optionally one or more compositions selected from the group consisting of:
 an oxidative dyeing composition C having a pH in the range of 7 to 12 and comprising one or more oxidative dye precursors and/or oxidative dye couplers, and one or more alkalizing agents, and
 an aqueous permanent waving composition D having a pH in the range of 7 to 12 and comprising one or more reducing agents and one or more alkalizing agents,
wherein the compositions C and D further comprise one or more polycarboxylic acids, or a salt thereof, selected from the group consisting of malic acid, oxalic acid, malonic acid, succinic acid, fumaric acid, adipic acid, maleic acid, glutaric acid, pyromelletic acid, a salt thereof, and a mixture thereof, and a weight ratio of the bleaching powder composition A to the aqueous oxidizing composition B is in a range of from 5:1 to 1:5.

2. The cosmetic composition according to claim 1, wherein the one or more compounds according to b) is glycine.

3. The cosmetic composition according to claim 1, wherein the total concentration of compounds according to b) is in the range of 0.05% to 0.3% by weight, calculated to the total weight of the aqueous oxidizing composition B.

4. The cosmetic composition according to claim 1, wherein the total concentration of hydrogen peroxide is in the range of 9% to 12% by weight, calculated to the total weight of the aqueous oxidizing composition B.

5. The cosmetic composition according to claim 1, wherein the aqueous oxidizing composition B has a pH in the range of 1.5 to 5.

6. The cosmetic composition according to claim 1, wherein the aqueous oxidizing composition B further comprises one or more lipophilic compounds f) selected from the group consisting of a $C_{12}$ to $C_{22}$ fatty alcohol, an ester of a $C_3$ to $C_{22}$ alcohols with a $C_{12}$ to $C_{22}$ fatty acids, a Ca to $C_{22}$ fatty acid, a vegetable oil, a silicone, a hydrocarbon-based product, and a mixture thereof.

7. The cosmetic composition according to claim 6, wherein the total concentration of the one or more lipophilic compounds f) is in the range of 1% to 20% by weight, calculated to the total weight of the aqueous oxidizing composition B.

8. The cosmetic composition according to claim 1, wherein the aqueous oxidizing composition B further comprising one or more surfactants as a compound g) selected from the group consisting of a non-ionic surfactant, an anionic surfactant, a cationic surfactant, an amphoteric/zwitterionic surfactant, and a mixture thereof.

9. The cosmetic composition according to claim 1, wherein the aqueous oxidizing composition B further comprises one or more thickening polymers.

10. The cosmetic composition according to claim 1, wherein the one or more persulfate salts of compound c) comprise sodium persulfate, ammonium persulfate, and potassium sulfate.

11. The cosmetic composition according to claim 1, wherein the one or more alkalizing agents as compound d) comprise sodium metasilicate and sodium carbonate.

* * * * *